US009162671B2

(12) United States Patent
Itoh et al.

(10) Patent No.: US 9,162,671 B2
(45) Date of Patent: Oct. 20, 2015

(54) HYBRID VEHICLE CONTROL UNIT (71) Applicant: DENSO CORPORATION, Kariya, Aichi-pref. (JP)

(72) Inventors: Yutaro Itoh, Kariya (JP); Noriaki Ikemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/595,439

(22) Filed: Jan. 13, 2015

(65) Prior Publication Data
US 2015/0197238 A1    Jul. 16, 2015

(30) Foreign Application Priority Data

Jan. 14, 2014 (JP) .................................... 2014-4059

(51) Int. Cl.
*B60L 11/18* (2006.01)
*B60K 6/28* (2007.10)
(Continued)

(52) U.S. Cl.
CPC ............... *B60W 20/106* (2013.01); *B60K 6/22* (2013.01); *B60K 6/26* (2013.01); *B60K 6/28* (2013.01); *B60L 1/02* (2013.01); *B60L 3/12* (2013.01); *B60L 11/18* (2013.01); *B60L 11/1809* (2013.01); *B60L 11/1811* (2013.01); *B60L 11/1812* (2013.01); *B60L 11/1861* (2013.01); *B60L 11/1862* (2013.01); *B60W 10/06* (2013.01); *B60W 10/08* (2013.01); *B60W 10/24* (2013.01); *B60W 10/26* (2013.01); *B60W 10/30* (2013.01);
(Continued)

(58) Field of Classification Search
CPC .............. B60K 6/20; B60K 6/26; B60K 6/28; B60K 6/22; B60K 6/32; B60L 3/12; B60L 11/18; B60L 11/1809; B60L 11/1811; B60L 11/1812; B60L 11/1861; B60L 11/1862; B60L 2210/00; B60L 2210/10; B60L 1/02; B60W 10/08; B60W 10/24; B60W 10/26; B60W 20/106; B60W 2710/244; B60W 2710/24; B60W 2510/244; Y02T 10/62; Y02T 10/7072; Y02T 10/7077; Y10S 903/907
USPC ........... 701/22, 36, 29.1, 34.2, 34.4; 903/903, 903/930; 180/65.1, 65.2, 65.265, 65.275, 180/65.285, 65.29, 65.31, 65.8; 290/40 C
See application file for complete search history.

(56) References Cited

U.S. PATENT DOCUMENTS 6,373,206 B1 *  4/2002  Morimoto et al. ............. 318/139
6,492,741 B1 * 12/2002  Morimoto et al. .......... 290/40 C
(Continued)

FOREIGN PATENT DOCUMENTS

JP        2013-018420         1/2013

*Primary Examiner* — Russell Frejd
(74) *Attorney, Agent, or Firm* — Nixon & Vanderhye P.C.

(57) ABSTRACT

A hybrid vehicle control unit (HV-ECU) sets a sub-battery voltage during an engine non-operation time to be lower than a sub-battery voltage during the normal time, which decreases a charge amount to the sub-battery relative to an amount during the normal time. The HV-ECU sets the sub-battery voltage during an engine operation time to be higher than the sub-battery voltage during the engine non-operation time, which increases the charge amount to the sub-battery relative to an amount during the engine non-operation time. A SOC control according to the above-described scheme prevents a SOC decrease of the sub-battery SOC in comparison to the conventional SOC control scheme, thereby preventing charging of the sub-battery when the main battery SOC is lower than a certain threshold. Therefore, a run-down of the sub-battery is prevented.

7 Claims, 10 Drawing Sheets

(51) Int. Cl.
  *B60L 1/02* (2006.01)
  *B60W 20/00* (2006.01)
  *B60W 10/06* (2006.01)
  *B60W 10/08* (2006.01)
  *B60W 10/26* (2006.01)
  *B60W 10/30* (2006.01)
  *B60L 3/12* (2006.01)
  *B60K 6/22* (2007.10)
  *B60K 6/26* (2007.10)
  *B60W 10/24* (2006.01)
  *B60K 6/32* (2007.10)
  *B60K 6/20* (2007.10)

(52) U.S. Cl.
  CPC ... *B60K 6/20* (2013.01); *B60K 6/32* (2013.01); *B60L 2210/00* (2013.01); *B60L 2210/10* (2013.01); *B60W 2510/244* (2013.01); *B60W 2710/24* (2013.01); *B60W 2710/244* (2013.01); *Y02T 10/62* (2013.01); *Y02T 10/7072* (2013.01); *Y02T 10/7077* (2013.01); *Y10S 903/907* (2013.01); *Y10S 903/93* (2013.01)

(56) References Cited

U.S. PATENT DOCUMENTS

| | | | |
|---|---|---|---|
| 6,840,055 B2* | 1/2005 | Iritani | 62/230 |
| 8,204,651 B2* | 6/2012 | Tachibana et al. | 701/41 |
| 8,498,766 B2* | 7/2013 | Takahashi et al. | 701/22 |
| 8,531,053 B2* | 9/2013 | Choi et al. | 307/9.1 |
| 2011/0198920 A1* | 8/2011 | Komuro et al. | 307/10.1 |
| 2011/0288705 A1* | 11/2011 | Kawasaki et al. | 701/22 |
| 2012/0262106 A1* | 10/2012 | Omiya et al. | 320/104 |
| 2013/0054069 A1* | 2/2013 | Komiya et al. | 701/22 |
| 2013/0096760 A1* | 4/2013 | Izumi | 701/22 |
| 2013/0249219 A1* | 9/2013 | Kim et al. | 290/36 R |

* cited by examiner

HYBRID VEHICLE CONTROL UNIT

CROSS REFERENCE TO RELATED APPLICATION

The present application is based on and claims the benefit of priority of Japanese Patent Application No. 2014-004059, filed on Jan. 14, 2014, the disclosure of which is incorporated herein by reference.

TECHNICAL FIELD

The present disclosure generally relates to a hybrid vehicle drive system having a hybrid vehicle control unit used in a hybrid vehicle that is equipped with an engine and a motor-generator.

BACKGROUND INFORMATION

In recent years, hybrid vehicles have become popular because of the social demand for low fuel consumption and low emission vehicles. In a hybrid vehicle, a drive power of the vehicle is procured from both of an engine and a motor-generator, and the engine in the hybrid vehicle is also used to charge batteries, that is, for charging a main battery by driving the motor-generator to generate electricity. Further, a heater device, or an electric heater, in the hybrid vehicle is operated by receiving an electric power either from the main battery or from a sub-battery that is electrically connected to the main battery, for heating a vehicle compartment or the like.

In the hybrid vehicle having an electric heater for heating operation, for example, the heater device disclosed in a patent document 1 (i.e., Japanese Patent Laid-Open No. 2013-18420) stops an electricity supply from the main battery to the sub-battery when a main battery SOC is equal to or lower than a preset value, so that a heating capacity of the heater device as well as an EV travel capacity of the hybrid vehicle are preserved without consuming the electric power in the main battery.

The technique in the patent document 1 may cause a run-down of the sub-battery when a low-SOC state of the main battery continues for a long time, due to a no-charge control of the sub-battery.

In view of such a shortcoming of the conventional technique, an idea of the present disclosure is devised.

SUMMARY

It is an object of the present disclosure to provide a hybrid vehicle drive system in a hybrid vehicle that is equipped with an engine, a motor-generator generating electricity by a drive force of the engine, a main battery chargeable and dischargeable in an exchange of electricity with the motor-generator, a sub-battery electrically connected with the main battery, and a DC-DC converter disposed (at a position) between the main battery and the sub-battery and converting an input voltage from the main battery to an output battery output to the sub-battery which is designated as a sub-battery voltage, which at least controls the sub-battery voltage.

The hybrid vehicle drive system also includes a hybrid vehicle control unit that controls a charge amount to charge the sub-battery in the following manner when a main battery SOC is lower than a preset threshold. A unit of the charge amount used in the following description is Watt, represented as "W."

In an engine non-operation time, the sub-battery voltage is set to a lower-than-normal value that is lower than a normal value being set in a normal time when the main battery SOC is equal to or higher than the threshold, for decreasing a charge amount to the sub-battery to be smaller than an amount in the normal time (i.e., a normal-time amount). In other words, a normal time is defined as a time when a main battery SOC is equal to or higher than a preset threshold. As such, when the main battery SOC is less than the preset threshold, in an engine non-operation time, the HV-ECU sets a sub-battery voltage during the engine operation time to be lower than a sub-battery voltage during the normal time, which decreases sub-battery charging during the engine non-operation time relative to sub-battery charging during the normal time.

In an engine operation time, the sub-battery voltage is set to a high value that is higher than an engine non-operation time value (S51) in/of the engine non-operation time, for increasing the charge amount to the sub-battery to be greater than an amount in the engine non-operation time (i.e., an engine non-operation time amount). In other words, when the main battery SOC is less than the preset threshold, in an engine operation time, the HV-ECU sets a sub-battery voltage during the engine operation time to be higher than the sub-battery voltage during the engine non-operation time, which increases sub-battery charging during the engine operation time relative to sub-battery charging during the engine non-operation time.

According to the present disclosure, when the main battery SOC is lower than the preset threshold, even though the charge to the sub-battery is restricted relative to the normal time during the engine operation time, the charge operation itself is performable (i.e., the charge of the sub-battery is not prohibited) during the engine operation time. Therefore, in comparison to the conventional technique in the patent document 1, the lowering of the sub-battery SOC is made harder, thereby preventing the run-down of the sub-battery.

On the other hand, during the engine non-operation time, the regenerated electric power from the motor-generator that is driven by the drive force of the engine, together with other electric power, are used to increase the charge amount to the sub-battery, thereby further securely preventing the run-down of the sub-battery.

Further, a sub-battery voltage control, for setting the sub-battery voltage in the engine operation time to the high value, further adjusts/increases the sub-battery voltage to a higher value as a drive load of the vehicle falls, for preferably increasing the charge amount to the sub-battery. In such manner, the engine load is increased when the drive load of the vehicle is low, thereby improving the engine efficiency as a result. In other words, the HV-ECU increases the sub-battery voltage as a drive load of the vehicle decreases, which increases the charge amount to the sub-battery.

In such a case, the charge amount to the sub-battery is determined to minimize a system loss that is calculated as a sum total of an engine loss and a sub-battery I/O loss caused by charge and discharge of the sub-battery, which yields/leads to an optimized system efficiency.

The hybrid vehicle control unit of the present disclosure may be applicable to a hybrid vehicle having an electric heater for heating a vehicle compartment or heating an engine, which is electrically connected to a sub-battery side of the DC-DC converter.

In such a case, in/during the engine non-operation time, an output of the electric heater is set to a smaller-than-normal value, which is smaller than a normal value in/of the normal time. In other words, the HV-ECU sets an output of the electric heater during the engine non-operation time to be less than an output of the electric heater during the normal time.

In/during the engine operation time, the output of the electric heater is set to a value that is greater than an engine non-operation time value, which is set to be greater than a value in/of the engine non-operation time (i.e., the great value set to be greater than the smaller-than-normal value). In other words, the HV-ECU sets an output of the electric heater during the engine operation time to be greater than the output of the electric heater during the engine non-operation time.

In such manner, when the main battery SOC is lower than the preset threshold, an electric power consumption of an EV travel is decreased than the normal time, while preventing the heating capacity for heating the vehicle compartment or for heating the engine.

Further, an electric heater output control, for setting the output of the electric heater in/during the engine operation time to the great value (i.e., to a value that is greater than the engine non-operation time value), further adjusts/increases the output of the electric heater to a greater value as a drive load of the vehicle falls, for preferably increasing (an amount of) electricity supplied from the DC-DC converter to the electric heater. In other words, the HV-ECU increases the output of the electric heater as a drive load of the vehicle decreases, which increases an amount of electricity supplied from the DC-DC converter to the electric heater. In such manner, the engine load is increased when the drive load of the vehicle is low, thereby improving the engine efficiency as a result.

Further, in such a case, an amount of decrease of the electric heater output set in the engine non-operation time (i.e., substantially, an EV travel time) is determined preferably based on an integration value of an amount of increase of the output of the electric heater in/during the engine operation time either of/in/during a so-far period that is a period of time between a specific previous time and a present time or of/in/during a past predetermined period that is a preset period of time in the past.

Further, the hybrid vehicle control unit of the present disclosure may preferably be configured to solely/entirely procure the electricity supplied to the DC-DC converter in/during the engine operation time from the motor-generator as a regenerated electric power thereof while controlling a discharge amount of the main battery to zero. In other words, the electricity supplied to the DC-DC converter in the engine operation time is procured entirely from the motor-generator.

In such manner, the energy loss accompanied by an input and output of the main battery is decreased. Further, since the control of the present disclosure is based on an assumption that the main battery SOC is low, the lowering of the main battery SOC approaching closer to a lower limit value is prevented by restricting the discharge of the main battery.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiment of the present disclosure is described with reference to the drawings.

Figure 1:
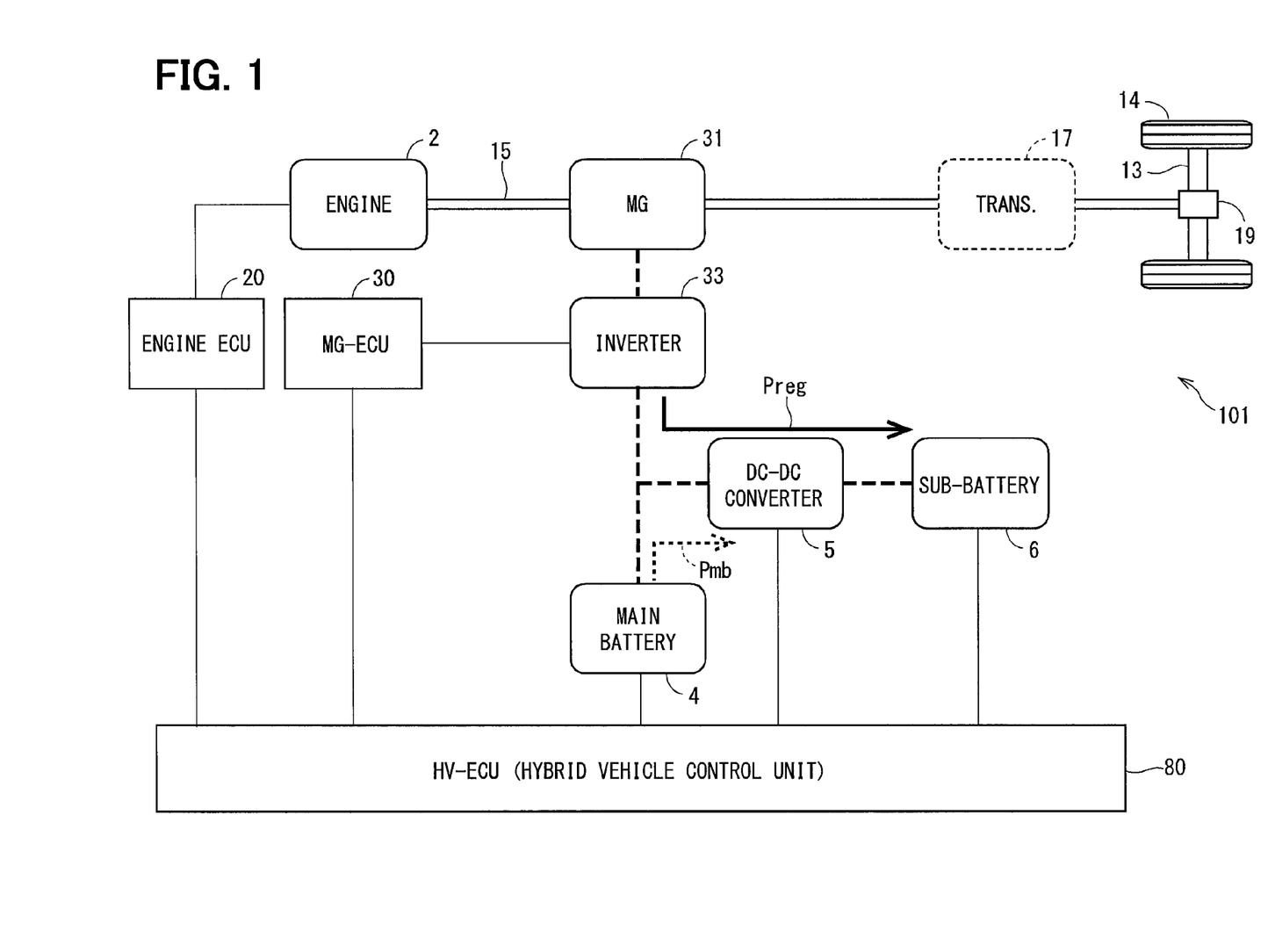
FIG. 1 is a system diagram of a hybrid vehicle which has a hybrid vehicle control unit in the present disclosure applied thereto.
Figure 6:
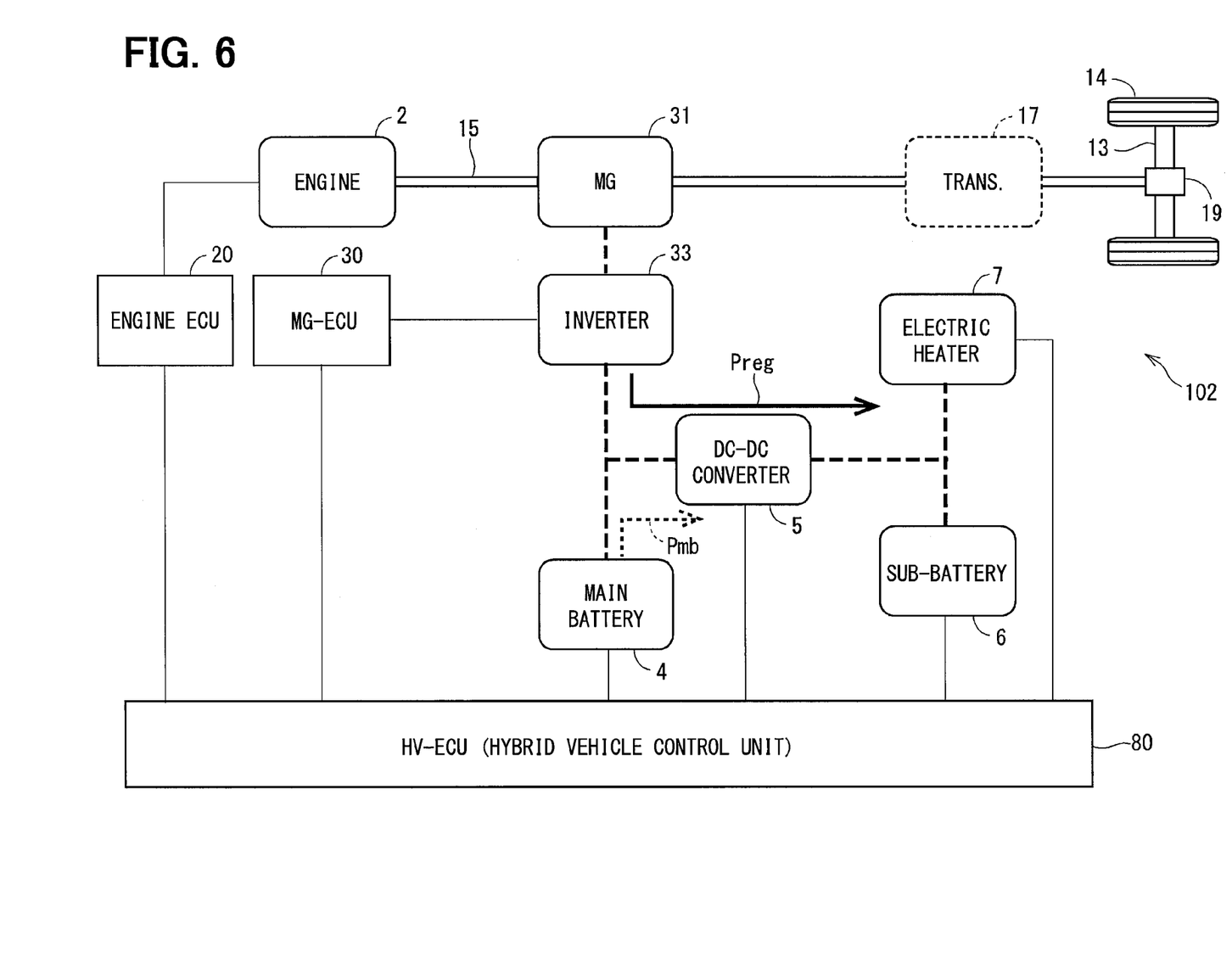
FIG. 6 is a system diagram of the hybrid vehicle which has the hybrid vehicle control unit in the present disclosure.
Figure 11:
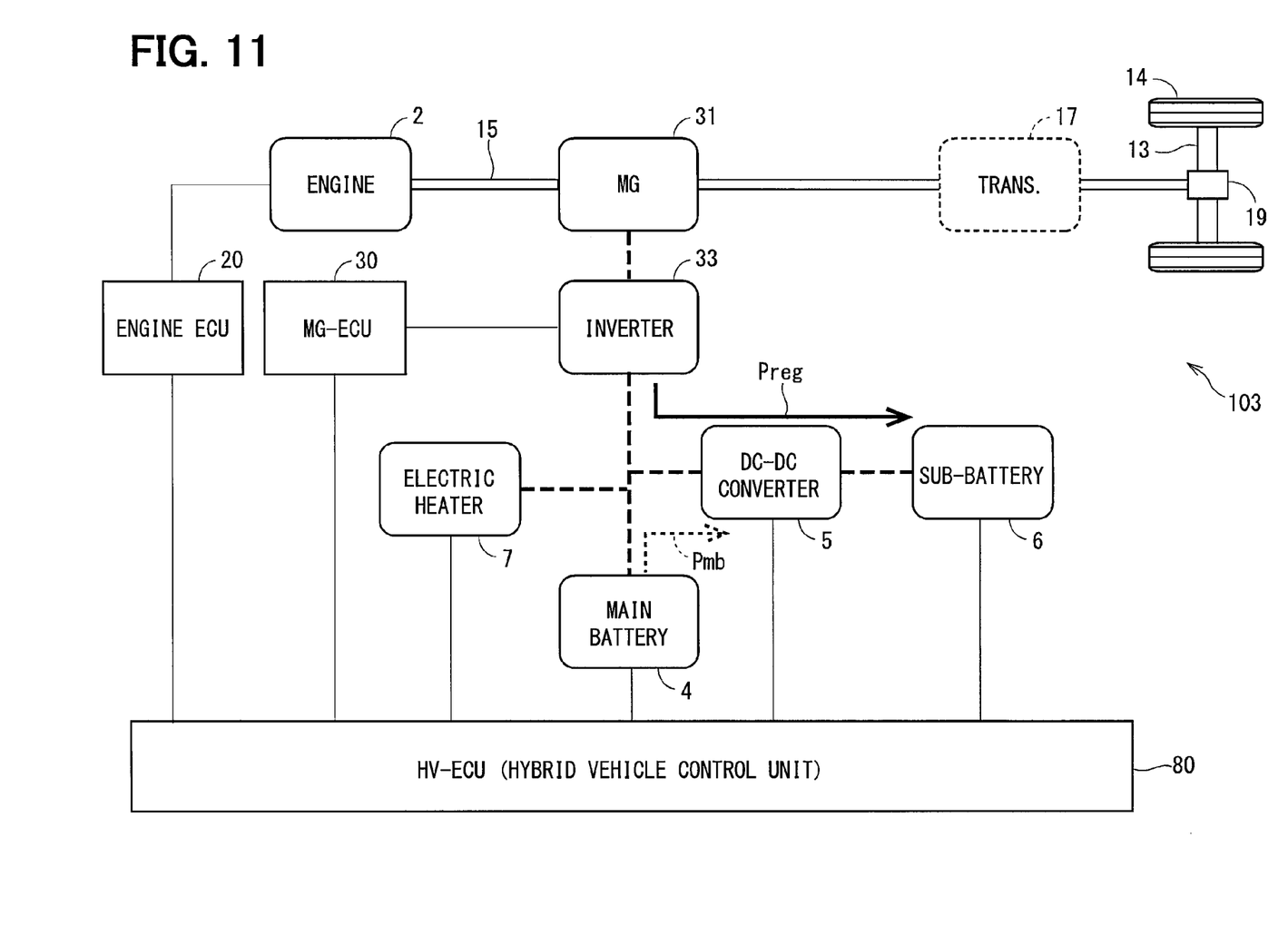
FIG. 11 is a system diagram of the hybrid vehicle which has the hybrid vehicle control unit in the present disclosure.

In FIG. 1, FIG. 6, and FIG. 11 respectively showing a configuration of a hybrid vehicle to which a hybrid vehicle control unit of each embodiment is applied, the same numeral is assigned to the same component, and the description of the same component is not repeated. In the drawings, a double line connecting two or more components represents a mechanical connection line, a thick broken line represents an electrical connection line, and a thin solid line represents a signal line.

(First Embodiment)

The configuration of the hybrid vehicle to which the hybrid vehicle control unit of the first embodiment of the present disclosure is applied is described with reference to FIG. 1.

A hybrid vehicle 101 shown in FIG. 1 is a parallel hybrid vehicle provided with an engine 2 and one motor-generator 31 as its source of a driving force. An HV-ECU 80 serving as a "hybrid vehicle control unit" arbitrates the driving force of the engine 2 and the motor-generator 31, and controls the drive of the hybrid vehicle 101 in an integrated manner. Especially, in each of the embodiments of the present disclosure, the HV-ECU 80 controls a supply of electric power to the sub-battery 6 mentioned later.

The driving force of the engine 2 is transmitted to a crankshaft 15, and drives the wheel 14 via a deferential gear mechanism 19 and an axle 13. An engine ECU 20 acquires information, including a crank angle of the crankshaft 15, an engine rotation speed, etc., based on a crank angle signal and the like which are inputted from a crank angle sensor (not illustrated), and controls an operation of the engine 2.

A motor-generator 31 is, for example, a permanent magnet type three-phase motor of a synchronous control, and is electrically connected with a main battery 4 via an inverter 33 which is a power converter for converting a direct-current power to/from an alternating current electric power of three phases.

The motor-generator 31 serves as a motor for outputting a mechanical power when receiving and consuming an electric power from the main battery 4, i.e., for driving the wheel 4 to assist a driving force of the engine 2, and also serves as a generator for outputting a regenerated electric power when receiving a driving power from a deceleration of the vehicle or from the engine 2.

Further, at a position between the motor-generator 31 and the deferential gear mechanism 19, as a dashed line shows, a transmission 17 may be provided for increasing or decreasing a rotation speed from both sides. The transmission 17 may have a clutch, or the clutch may be provided at a position between the engine 2 and the motor-generator 31.

An MG-ECU 30 controls a switching operation of the inverter 33, based on a torque instruction from the HV-ECU 80 and an electrical angle signal from a rotation angle sensor provided near a rotor of the motor-generator 31, etc., and controls a supply of electric power to the motor-generator 31.

Further, at a position between the main battery 4 and the inverter 33, a booster converter for boosting the direct-current electric power of the main battery 4 may be provided.

The main battery 4 is an electricity storage device capable of charging and discharging electricity such as a nickel hydride battery, and a lithium ion battery, for example, and a device such as an electric double layer capacitor, etc., may also be serving as one form of the main battery 4.

The main battery 4 is charged within a certain limit range of SOC (State Of Charge). The information on SOC of the main battery 4 is transmitted to the HV-ECU 80.

A DC-DC converter 5 is connected to an electric power path on a main battery 4 side of the inverter 33. Further, on an opposite side of the DC-DC converter 5 relative to the main battery 4, the sub-battery 6 is connected.

The DC-DC converter 5 converts an input voltage from the main battery 4 to an output voltage to the sub-battery 6 (henceforth designated as a "sub-battery voltage"). Since the main battery 4 side has a higher voltage relative to the sub-battery 6 side, the DC-DC converter 5 lowers the high voltage on the main battery 4 side to output a low voltage toward the sub-battery 6.

The sub-battery 6 supplies an electric power to various auxiliary devices, such as a fan, a blower, a pump and the like in the vehicle.

In such a configuration, the AC power generated by the motor-generator 31 is converted into the DC power by the inverter 33, and is supplied to the main battery 4 and to the DC-DC converter 5 as a regenerated electric power. Further, the electric power discharged from the main battery 4 is supplied to the motor-generator 31 via the inverter 33, or is supplied to the sub-battery 6 via the DC-DC converter 5, depending on a situation.

In FIG. 1, a solid line arrow from the inverter 33 to the DC-DC converter 5 shows (a flow of) a regenerated electric power Preg, and a dashed line arrow from the main battery 4 to the DC-DC converter 5 shows (a flow of) an electric power Pmb discharged from the main battery 4.

The HV-ECU 80 receives an input of various signals, i.e., an accelerator signal from an accelerator sensor, a brake signal from a brake switch, a shift signal from a shift switch, a speed signal about the speed of the vehicle, etc., and determines a drive state of the vehicle based on information obtained therefrom.

The HV-ECU 80 communicates/exchanges information with the engine ECU 20, the MG-ECU 30, the main battery 4, the DC-DC converter 5, and the sub-battery 6, and controls a driving force of the engine 2 and the motor-generator 31, as well as charge and discharge of the main battery 4, and the sub-battery 6, etc., in an integrated manner.

Further, other ECUs may also be provided at a position in between (i) the HV-ECU 80 and (ii) the main battery 4, the DC-DC converter 5 and the sub-battery 6.

In the embodiments of the present disclosure, the HV-ECU 80 controls the sub-battery voltage by providing an instruction to the DC-DC converter 5, based on a determination of whether SOC of the main battery 4 is lower than a preset threshold or is equal to or higher than the threshold, and whether the engine 2 is in operation or is not in operation (i.e., whether it is in an engine operation time or in an engine non-operation time).

Regarding the above description, an "engine non-operation time" includes a vehicle stop time. However, the present disclosure assumes a situation of an (electric power) output being provided from the sub-battery 6, it (the "engine non-operation time") practically means an EV travel time, which is a travel of the hybrid vehicle by an output of mechanical power from the motor-generator 31.

Figure 2:
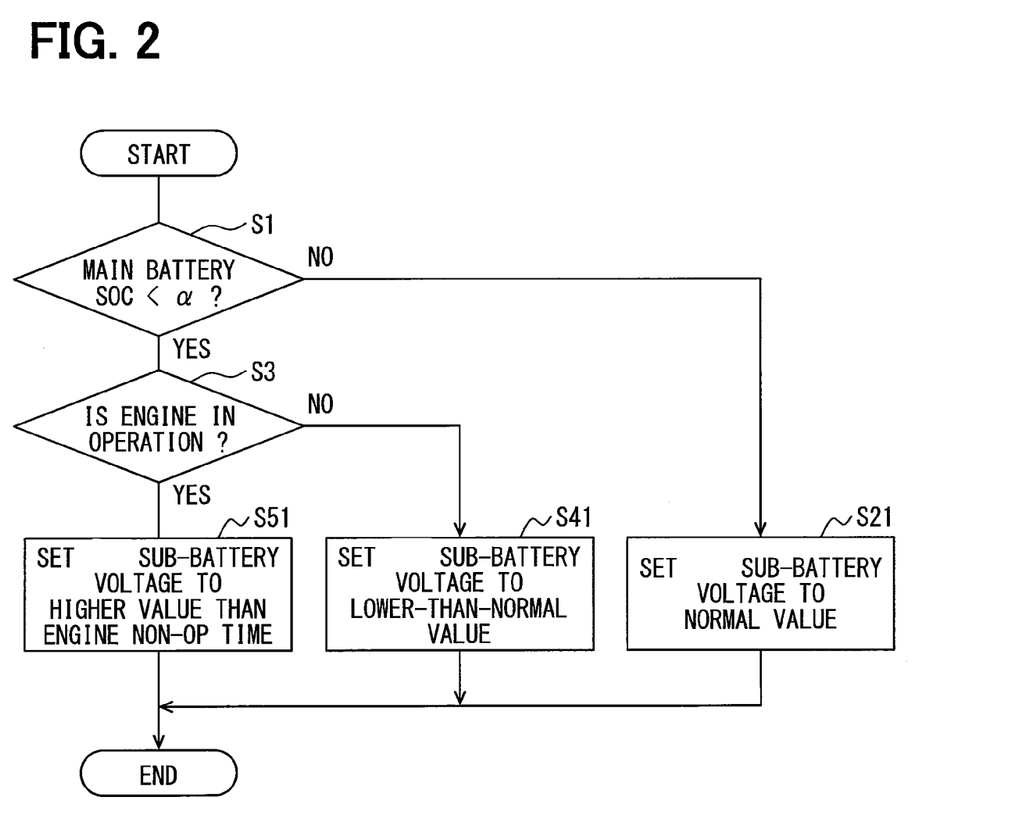
FIG. 2 is a flowchart of a sub-battery voltage control in the present disclosure.

Next, the control performed by the HV-ECU 80 in the first embodiment is described with reference to a flowchart in FIG. 2. The sign "S" means a "step" in the description of the following flowcharts.

In S1, it is determined whether SOC of the main battery 4 is smaller than threshold value α. The threshold value α may be set, for example, as any value, e.g. 40%, 50%, 60% or the like.

A time when SOC of the main battery 4 is equal to or greater than the threshold value α is referred to as a "normal time." In the normal time, S1 is determined as NO, and S21 sets the sub-battery voltage to a normal value.

When SOC of the main battery 4 is smaller than the threshold value α (S1:YES), it is determined in S3 whether the engine 2 is in operation (i.e., in an engine operation time). When the engine 2 is not in operation (S3:NO) (i.e., in an engine non-operation time), S41 sets the sub-battery voltage to be lower than the normal value.

When the engine 2 is in operation, i.e., in the engine operation time (S3:YES), S51 sets the sub-battery voltage to be higher than the value in the engine non-operation time, i.e., the value set in S41.

If the normal value set in S21 is, for example, 13 [V], the value set in S41 in the engine non-operation time is lower than 13 [V], that is, for example, 11 [V].

Further, the value set in S51 in the engine operation time is higher than 11 [V] in the engine non-operation time, that is, for example, may be set to 12 [V], or to 14 [V]. That is, in other words, the preset value in the engine operation time may either be higher than or be lower than the normal value.

Thus, the "sub-battery charge amount" in a unit of electric power [W] (=voltage [V]×current [A]) is controlled by changing the sub-battery voltage. That is, in the engine non-operation time, the sub-battery voltage is set to be lower than the normal value, and the charge amount of the sub-battery is decreased by reducing the electric power supply from the main battery 4 side of the DC-DC converter 5.

On the other hand, the sub-battery voltage is set to be higher than the engine non-operation time, and the charge amount of the sub-battery is increased by promoting/increasing the electric power supply from the main battery 4 side of the DC-DC converter 5 in the engine operation time.

Figure 3:
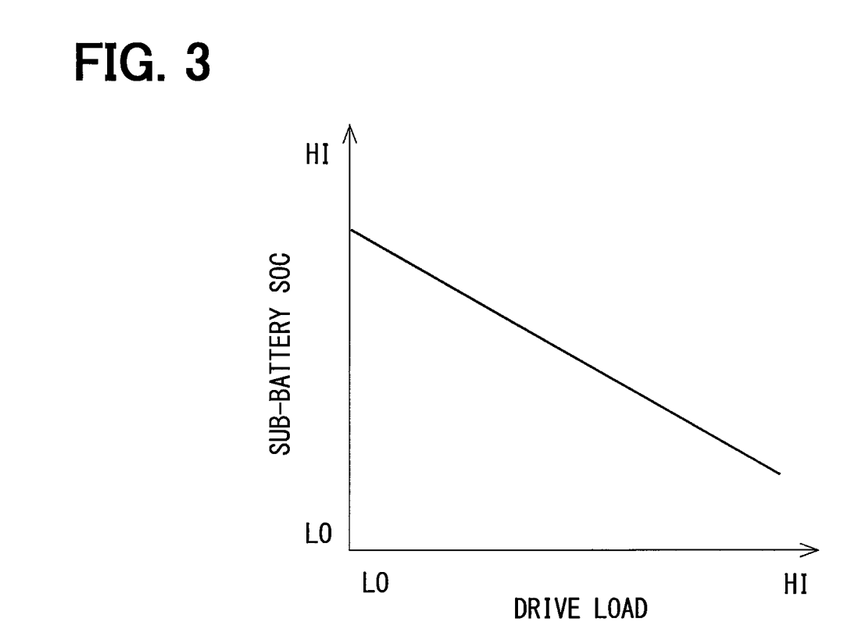
FIG. 3 is a map diagram of a relationship between a drive load and a charge amount of the sub-battery.
Figure 4A:
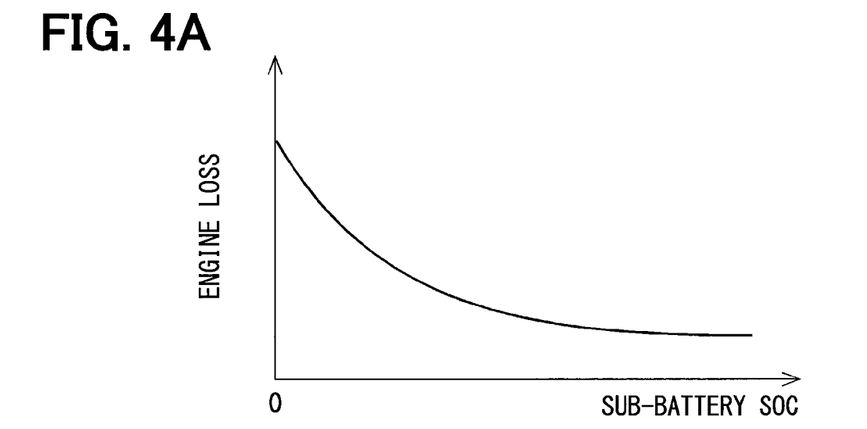
FIGS. 4A, 4B, 4C are map diagrams of a relationship between the charge amount of the sub-battery and (A) an engine loss, (B) a sub-battery loss, and (C) a system loss.
Figure 4B:
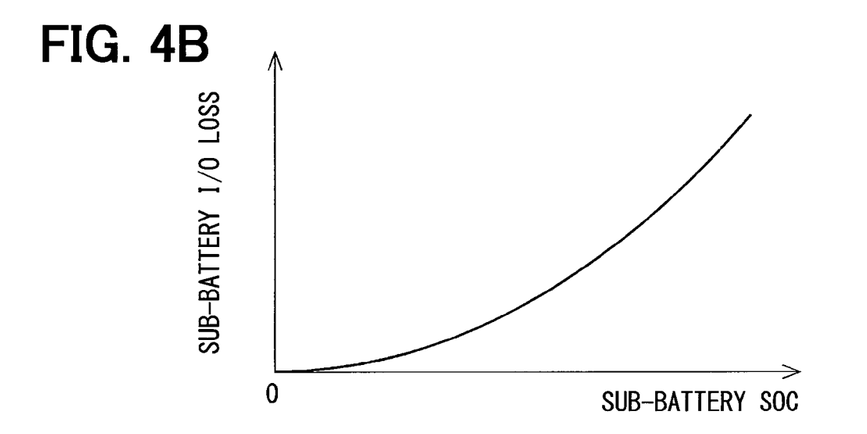
Figure 4C:
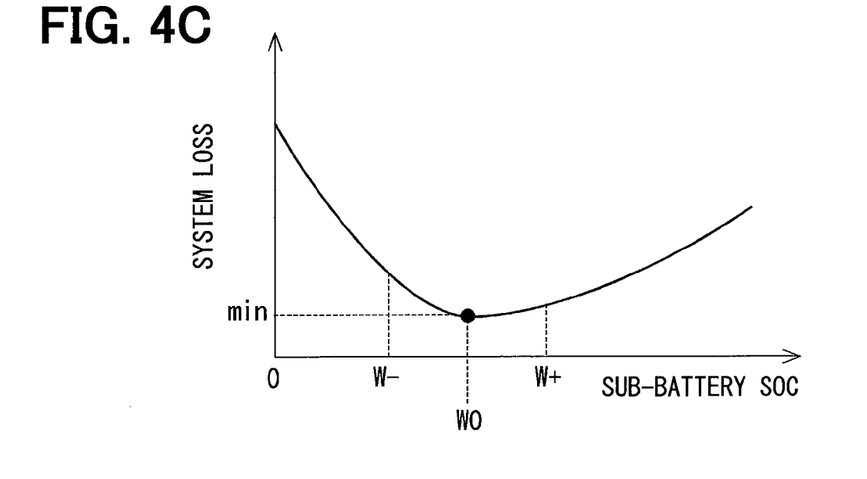

Further, in S51, a map of FIG. 3 or a map of FIGS. 4A, 4B, 4C which respectively specifies a relationship between the charge amount of the sub-battery and other parameters is used, and the sub-battery voltage in the engine operation time is set up appropriately.

FIG. 3 shows a map of a relationship between a drive load of the vehicle and the charge amount of the sub-battery, and the graph line falls toward the right side of the graph. In other words, the control performed by the HV-ECU 80 is that the sub-battery voltage is set to be higher as the drive load falls, for an increase of the charge amount of the sub-battery. In this map diagram, the charge amount of the sub-battery, i.e., an absolute value of the vertical axis of the map, is suitably determined according to a requested charge amount etc.

FIGS. 4A and 4B are a characteristic diagram of a relationship between the charge amount of the sub-battery and an engine loss, and a relationship between the charge amount of the sub-battery and a sub-battery I/O loss.

The engine loss in FIG. 4A means the rate of loss of the thermal energy of fuel, which is not effectively changed into driving force. Generally, the engine efficiency is high when the drive load is high, and thus the engine loss decreases. Due to a correlation between the charge amount of the sub-battery and the electric power generated by the motor-generator 31 that is driven by the driving force of the engine 2, the engine loss decreases when the charge amount of the sub-battery is large. Further, when the charge amount of the sub-battery is large, a negative inclination of the graph line becomes gentle.

The sub-battery I/O loss in FIG. 4B is mainly a Joule heat generated with an internal resistance in association with the charge and discharge of the sub-battery 6. The sub-battery I/O loss becomes large when the charge amount of the sub-battery is large, and a positive inclination of the graph becomes steep, when the charge amount of the sub-battery is large.

The system loss in FIG. 4C is a sum total of the engine loss and the sub-battery I/O loss, and is represented by a convex curve. The HV-ECU 80 sets in S51, i.e., in the engine operation time, a target control value to the sub-battery charge amount W0 that corresponds to the minimum value (min) of the system loss.

Therefore, when the sub-battery charge amount based on the sub-battery voltage in the normal time is smaller than W0 (W−), the sub-battery voltage in the engine operation time is set to be higher than the normal value, and, when the sub-battery charge amount based on the sub-battery voltage in the normal time is larger than W0 (W+), the sub-battery voltage in the engine operation time is set to be lower than the normal value.

Next, the effects in the present embodiment of the present disclosure achieved by the control of the sub-battery voltage is described with reference to a time chart in FIGS. 5A, 5B, in comparison to the conventional technique.

Figure 5A:
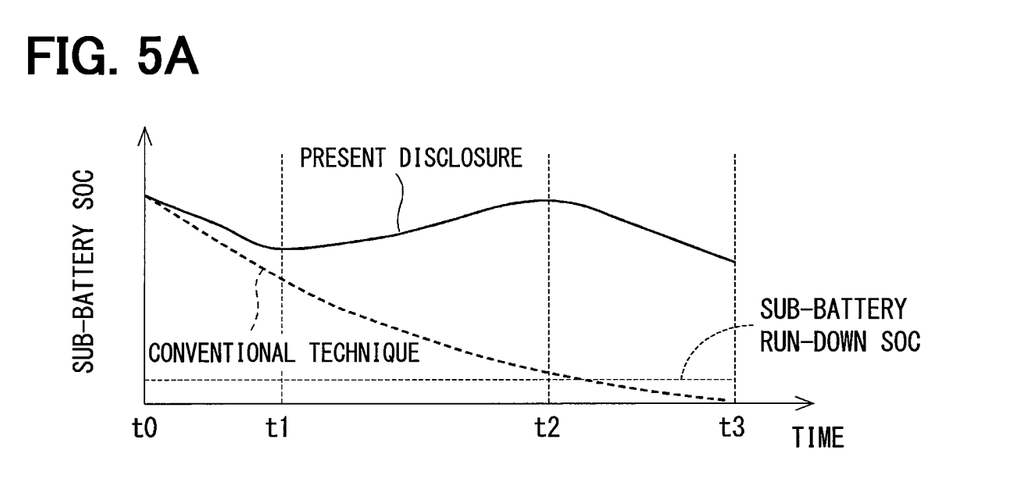
FIGS. 5A, 5B are a time chart of effectiveness of the sub-battery voltage control in the present disclosure.
Figure 5B:
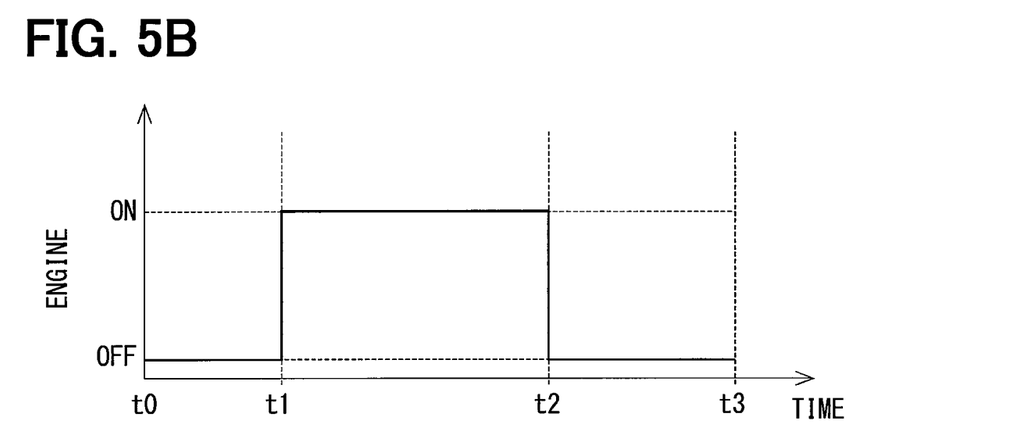

FIG. 5B shows an ON/OFF state of the engine 2 and FIG. 5A shows a change of the sub-battery SOC according to such an ON/OFF of the engine 2, respectively using a solid line for the embodiment of the present disclosure and a dashed line for the conventional technique.

Here, since the contents shown in FIGS. 5A and 5B are shared by all the embodiments in the present disclosure, the notation in FIG. 5A reads "PRESENT DISCLOSURE" instead of "FIRST EMBODIMENT."

When SOC of the main battery 4 is smaller than the threshold value α, the conventional technique completely stops the electric power supply from the main battery 4 to the sub-battery 6. Therefore, if the drive of the auxiliary devices is performed using the electric power of the sub-battery 6, the sub-battery SOC continues to fall. Thus, the sub-battery SOC falls to be lower than the "sub-battery run-down SOC" between time t2 and time t3, and sub-battery run-down is caused.

In the present embodiment of the present disclosure, when SOC of the main battery 4 is lower than the threshold value α, the charging to the sub-battery 6 is not completely prohibited, even though the charging is somewhat restricted in the engine non-operation time, i.e., time t0-t1 and time t2-t3. Therefore, compared with the conventional technique, the sub-battery SOC is harder to fall, and the sub-battery run-down is prevented.

On the other hand, in the engine operation time of time t1-t2, due to an increase of the charge amount of the sub-battery by the regenerated electric power from the motor-generator 31 that is driven by the driving force of the engine 2, the sub-battery SOC goes up. Therefore, the sub-battery run-down is further, or more securely, prevented than in the engine non-operation time.

Since the regenerated electric power is also charged to the main battery 4 and is also used as an electric power for an EV travel of the vehicle in the above-described situation, EV travel capacity is simultaneously secured.

Further, in the first embodiment, in the engine operation time, the sub battery voltage is set to be higher when the drive load of the vehicle is low as described above in FIG. 3, and it makes the charge amount of the sub-battery increase. Therefore, the engine load is raised in such manner when the drive load of the vehicle is low, which achieves an improvement of the engine efficiency as a result.

Further, as shown in FIG. 4, when the charge amount to the sub-battery 6 is determined to minimize the system loss which is the sum total of the engine loss and the sub-battery I/O loss, the system efficiency is optimized.

In addition, as shown in FIG. 1, the electric power supplied to the DC-DC converter 5 is procured solely from the regenerated electric power Preg by the motor-generator 31 while controlling the discharge amount Pmb from the main battery 4 to zero. Thereby, the energy loss accompanying the I/O of the main battery 4 is reduced. Further, by restricting the discharge from the main battery 4, SOC of the main battery 4 is prevented from approaching a lower limit.

(Second Embodiment)

The configuration of the hybrid vehicle to which the hybrid vehicle control unit of the second embodiment of the present disclosure is applied is described with reference to FIG. 6.

As shown in FIG. 6, in a hybrid vehicle 102, an electric heater 7 is connected to the sub-battery 6 side of the DC-DC converter 5. The electric heater 7 includes all the devices that generate heat with the electrical energy, which may be a heat pump, a PTC heater, a seat heater, etc. and are used for heating of the vehicle compartment or warming the components in the vehicle. The HV-ECU 80 controls the electric power supplied to the electric heater 7 from the DC-DC converter 5 according to the requested power of the electric heater 7.

Figure 7:
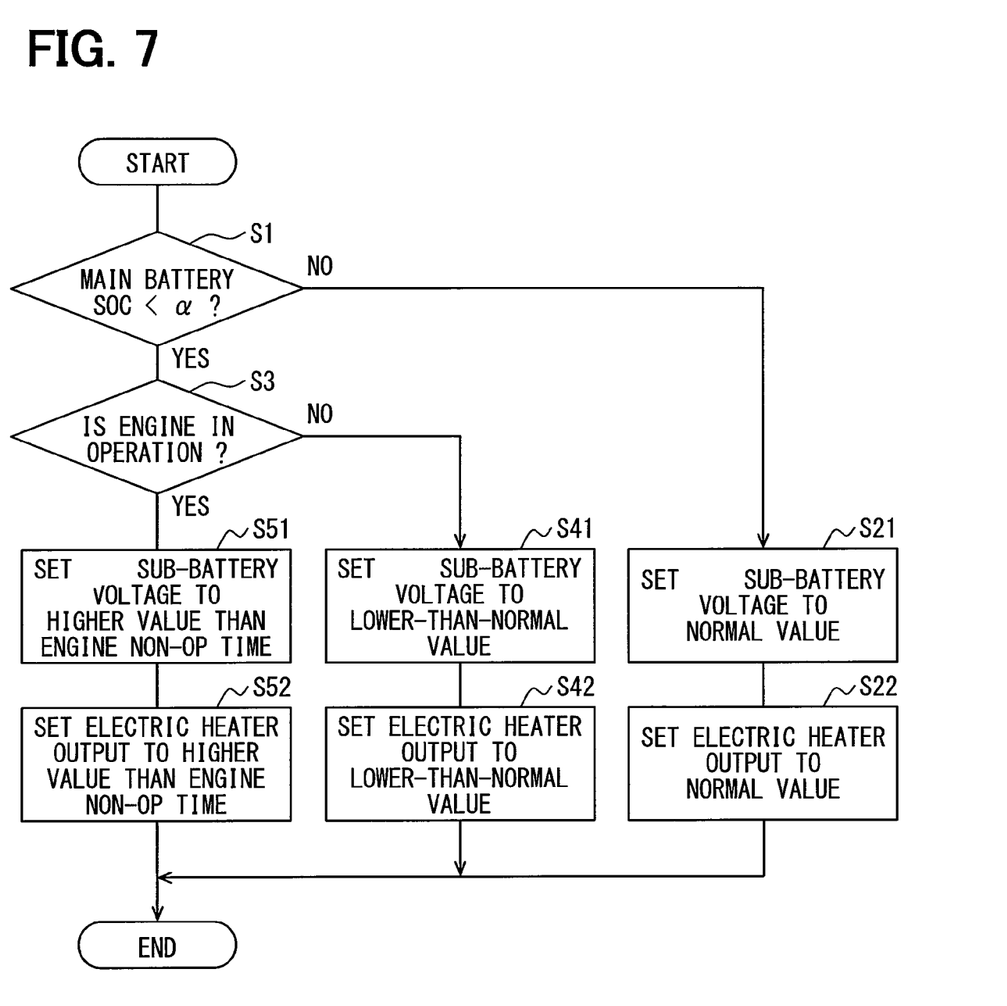
FIG. 7 is a flowchart of a control regarding a sub-battery control and an electric heater output in the present disclosure.

Next, the control performed by the HV-ECU 80 in the second embodiment is described with reference to a flowchart of FIG. 7. In FIG. 7, the same step number substantially points to the same step in the first embodiment of FIG. 2, and description of the same step is omitted.

In the control of the second embodiment, Steps S22, S42 or S52, which respectively set an output of the electric heater, are performed subsequently to Steps S21, S41 or S51 which set the sub-battery voltage in FIG. 2.

When SOC of the main battery 4 is equal to or greater than the threshold value α (S1:NO), i.e., in the normal time, the output of the electric heater is set in S22 to the normal value, subsequent to S21.

When SOC of the main battery 4 is smaller than the threshold value α (S1:YES) and in the engine non-operation time (S3:NO), the output of the electric heater is set in S42 to a value that is smaller than the normal value, subsequent to S41.

When SOC of the main battery 4 is smaller than the threshold value α (S1:YES) and in the engine operation time (S3:YES), the output of the electric heater is set in S52 to a value that is greater than the value in the engine non-operation time, subsequent to S51.

Figure 8:
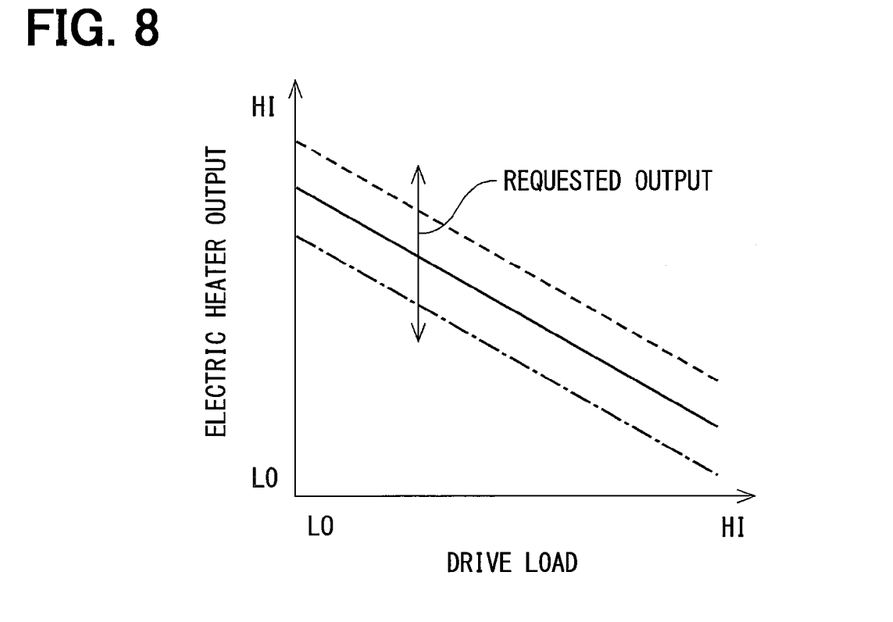
FIG. 8 is a map diagram of a relationship between the drive load and the electric heater output.

In S52, the output of the electric heater is set to a large value when the drive load of the vehicle is low, according to a map in FIG. 8. The map is prepared in plural pieces according to the magnitude of the requested output of the electric heater 7.

Relative to a characteristic line for a standard requested output, which is represented by a solid line, a characteristic line for a greater-than-standard requested output is represented by a broken line, i.e., an upward shifted line of the standard output, and a characteristic line for a smaller-than-standard requested output is represented by a dashed line, i.e., an downward shifted line of the standard output. Further, the inclination of each of those lines is not necessarily a constant one.

Figure 9:
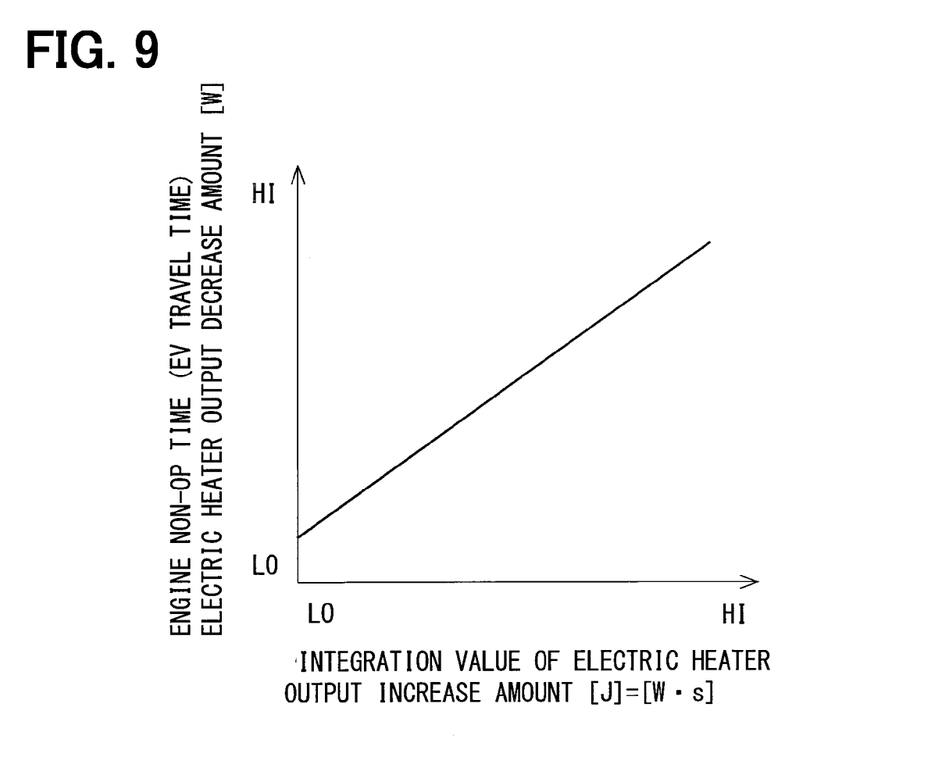
FIG. 9 is a map diagram of a relationship between an integration value of an amount of increase of the electric heater output and an amount of decrease of the electric heater output in the engine non-operation time.

Further, as shown in FIG. 9, an amount of decrease of the output of the electric heater 7, which is smaller than the normal value in the engine non-operation time (i.e., mainly an EV travel time) is set in S42 based on an integration value [J] (=[W·s]) of the amount of increase of the output of the electric heater so far, up to the present time.

That is, in other words, when the integration value of the increase of the output of the electric heater 7 is large, which means that thermal energy for heating is already reserved, the amount of decrease of the output is increasable/increased without deteriorating the heating capacity.

Here, an integration period for calculating the integration value may be set as a so-far period that is a period of time between a specific previous time and a present time or as a past predetermined period that is a preset period of time in the past. For example, in case that an ON (operation)/OFF (stop) of the engine 2 has been repeated for a couple of times so far, the output of the electric heater in not only the immediately-before engine operation time but also previous engine operation times may have an influence on the room temperature or the component temperature, thereby the output of the electric heater in such engine operation times may be included in the integration calculation as the so-far period.

Figure 10A:
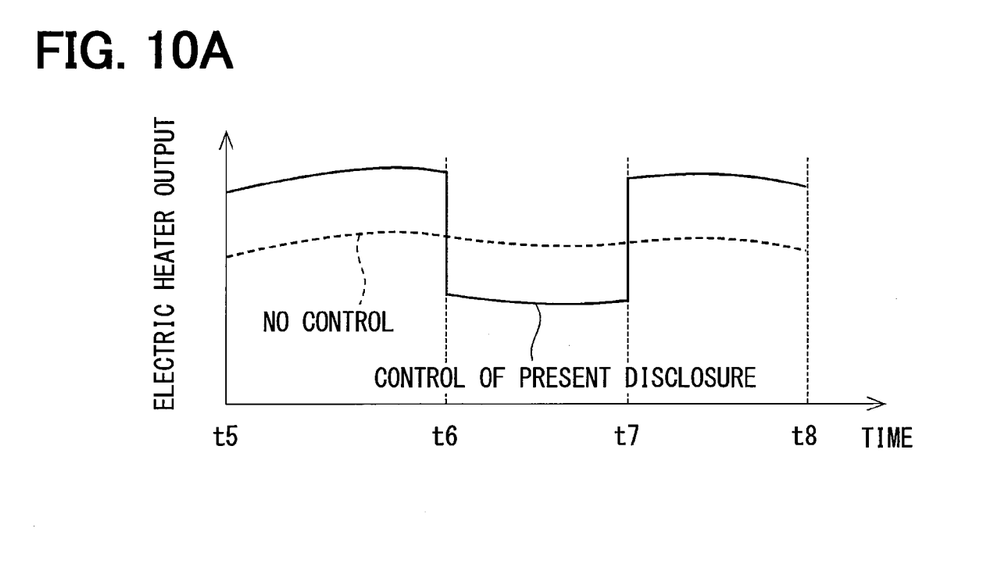
FIGS. 10A, 10B are a time chart of a control of the electric heater output in the present disclosure.
Figure 10B:
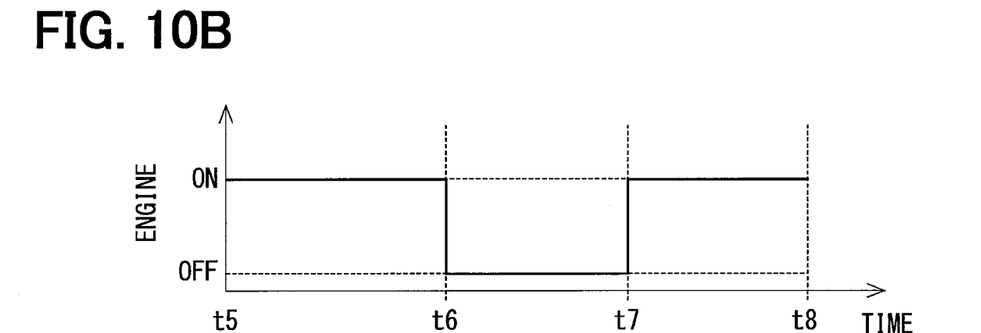

Next, with reference to a time chart in FIGS. 10A and 10B, the electric heater output control in the second embodiment is described.

FIG. 10B shows an ON/OFF state of the engine 2 and FIG. 10A shows a change of the output of the electric heater 7 according to such an ON/OFF of the engine 2, respectively using a solid line for the present disclosure case and a dashed line for the no control case.

When the control of the present disclosure is not used, the output of the electric heater 7 is not affected by an ON/OFF of the engine 2.

When the control of the present disclosure is used, in the period of time t6-time t7 during which the engine 2 stops, the output of the electric heater 7 decreases compared with the no control case.

In the period of time t5-time t6 and time t7-time t8 during which the engine 2 operates, the output of the electric heater 7 becomes large compared with the stop time of the engine 2. Therefore, the output of the electric heater changes in a stepwise manner at the engine 2 ON/OFF switching times.

As mentioned above, in the second embodiment, the hybrid vehicle 102 has a configuration in which the electric heater 7 is connected to the sub-battery 6 side of the DC-DC converter 5. In such a configuration, when SOC of the main battery 4 is lower than the threshold value α, in addition to the sub-battery voltage control, the HV-ECU 80 performs the electric heater output control.

Just like the sub-battery voltage control, in the engine non-operation time, i.e., in an EV travel time, the electric heater output control sets the output of the electric heater 7 to be smaller than the normal value that is used in the normal time, and, in the engine operation time, sets the output of the electric heater 7 to be greater than the set value in the engine non-operation time. In such manner, while preventing the lowering of the heating capacity, the electric power consumption amount in the EV travel time is reduced compared with the normal time.

Further, in the engine operation time, the output of the electric heater 7 is set to be greater as the drive load of the vehicle falls to be low, and the electric power supplied to the electric heater 7 is increased from the DC-DC converter 5 in the engine operation time, as shown in FIG. 8. Therefore, the engine load is raised in such manner when the drive load of the vehicle is low, which achieves an improvement of the engine efficiency as a result.

Further, as shown in FIG. 9, the amount of decrease of the output of the electric heater 7 in the engine non-operation time, i.e., in the EV travel time, is determined, based on the integration value of the amount of increase of the output of the electric heater 7 in the engine operation time.

Thereby, the electric power consumption in the EV travel time is reduced appropriately, taking into consideration a reservation of heating capacity.

In addition, as shown in FIG. 6, the same effect as the first embodiment is achieved because the configuration of the present embodiment, in which the electric power to be supplied to the DC-DC converter 5 is procured solely from the regenerated electric power Preg regenerated by the motor-generator 31 while controlling the discharge amount Pmb from the main battery 4 to zero.

(Third Embodiment)

The configuration of the hybrid vehicle to which the hybrid vehicle control unit of the third embodiment of the present disclosure is applied is described with reference to FIG. 11.

As shown in FIG. 11, in a hybrid vehicle 103, the electric heater 7 is connected to the main battery 4 side of the DC-DC converter 5, and the regenerated electric power from the motor-generator 31 or the electric power discharged from the main battery 4 is supplied thereto, for heating the compartment or for warming the vehicle component.

As such, the electric heater 7 may be connected not only on the sub-battery 6 side but on the main battery 4 side of the DC-DC converter 5.

However, as described in the second embodiment, the electric heater output control, in which the output of the electric heater 7 is changed depending on the engine operation/non-operation time when SOC of the main battery 4 is lower than the threshold value α, is based on an assumption that the electric heater 7 is connected on the sub-battery 6 side (of the converter 5).

Therefore, a characteristic control of the third embodiment is fundamentally the same as the control of the first embodiment.

(Other Embodiments)

As shown in FIGS. 1, 6, 11, the hybrid vehicle which has the hybrid vehicle control unit of the present disclosure is typically configured to have one motor-generator 31. However, the hybrid vehicle control unit of the present disclosure may be applicable to the hybrid vehicle that has an engine and two motor-generators together with a power split mechanism that distributes the driving force from the engine, i.e., to a so-called series-parallel hybrid vehicle.

Further, the motor-generator, which generates electric power by receiving the driving force from the engine, may be replaced with a fuel cell, which generates electric power by causing a chemical reaction between hydrogen and oxygen. In such a case, the "engine" in the claims may be replaced with the "fuel cell."

As mentioned above, the present disclosure is not limited to the above-described embodiments, but is variously implemented as long as the gist of the disclosure is realized and achieved therein.

What is claimed is:

1. A hybrid vehicle drive system installed in a hybrid vehicle, the hybrid vehicle drive system comprising:
   an engine;
   a motor-generator generating electricity by a drive force of the engine;
   a main battery chargeable and dischargeable in an exchange of electricity with the motor-generator;
   a sub-battery electrically connected with the main battery;
   a DC-DC converter disposed between the main battery and the sub-battery and converting an input voltage from the main battery to an output battery voltage that is output to the sub-battery which is designated as a sub-battery voltage; and
   a hybrid vehicle control unit (HV-ECU) controlling the sub-battery voltage of the sub-battery, wherein
   a normal time is defined as a time when a main battery SOC is equal to or higher than a preset threshold, and
   when the main battery SOC is less than the preset threshold,
   (i) in an engine non-operation time, the HV-ECU sets a sub-battery voltage during the engine non-operation time to be lower than a sub-battery voltage during the normal time to decrease sub-battery charging during the engine non-operation time relative to sub-battery charging during the normal time, and
   (ii) in an engine operation time, the HV-ECU sets a sub-battery voltage during the engine operation time to be higher than the sub-battery voltage during the engine non-operation time to increase sub-battery charging during the engine operation time relative to sub-battery charging during the engine non-operation time.

2. The hybrid vehicle drive system of claim 1, wherein
   the HV-ECU increases the sub-battery voltage as a drive load of the vehicle decreases to increase sub-battery charging.

3. The hybrid vehicle drive system of claim 2, wherein
   the charge amount to the sub-battery is determined to minimize a system loss that is calculated as a sum of an engine loss and a sub-battery I/O loss caused by charge and discharge of the sub-battery.

4. The hybrid vehicle drive system of claim 1, further comprising:
   an electric heater heating at least one of a vehicle compartment or the engine, the electric heater being controlled by the HV-ECU and electrically connected to a sub-battery side of the DC-DC converter, wherein
   the HV-ECU sets an output of the electric heater during the engine non-operation time to be less than an output of the electric heater during the normal time, and
   the HV-ECU sets an output of the electric heater during the engine operation time to be greater than the output of the electric heater during the engine non-operation time.

5. The hybrid vehicle drive system of claim 4, wherein
   the HV-ECU increases the output of the electric heater as a drive load of the vehicle decreases, which increases an amount of electricity supplied from the DC-DC converter to the electric heater.

6. The hybrid vehicle drive system of claim 4, wherein
   an amount of decrease of the output of the electric heater during the engine non-operation time is determined based on an integrated value of an amount of increase of the output of the electric heater during the engine operation time either during a period of time between a present time and a specific previous time and or during a past predetermined period of time.

7. The hybrid vehicle drive system of claim 1, wherein
   the electricity supplied to the DC-DC converter in the engine operation time is procured entirely from the motor-generator.

* * * * *